(12) United States Patent
Endres et al.

(10) Patent No.: US 6,595,114 B1
(45) Date of Patent: Jul. 22, 2003

(54) PANCAKE AND EGG COOKING APPLIANCE

(75) Inventors: William S. Endres, Leawood, KS (US); W. Eric Endres, Olathe, KS (US); Duane K. Smith, Shawnee, KS (US); Mark T. Krasne, Overland Park, KS (US)

(73) Assignee: Select Brands, Inc., Lenexa, KS (US)

( * ) Notice: Subject to any disclaimer, the term of this patent is extended or adjusted under 35 U.S.C. 154(b) by 0 days.

(21) Appl. No.: 10/224,682

(22) Filed: Aug. 20, 2002

(51) Int. Cl.[7] .......................... A47J 37/00; A47J 37/06; A47J 37/08; H05B 1/00; H05B 3/06
(52) U.S. Cl. .............................. 99/342; 99/349; 99/372; 99/374; 99/377; 99/378; 99/380; 99/395
(58) Field of Search ........................... 99/327–333, 341, 99/342, 372–384, 392–395, 400, 401, 444–450; 219/492, 494, 497, 521, 524, 525, 537, 538, 450.1, 451.4; 426/523, 138, 501, 514, 441, 442

(56) References Cited

U.S. PATENT DOCUMENTS

| 1,737,620 A | * | 12/1929 | Talbot .................... 99/375 X |
| 2,314,872 A | * | 3/1943 | Dickey ................... 99/372 X |
| 2,367,847 A | * | 1/1945 | Dickey ................... 99/379 X |
| 3,963,898 A | * | 6/1976 | Tuckwell ................ 219/524 |
| 3,978,238 A | * | 8/1976 | Frey et al. ............... 426/523 |
| 5,138,938 A | * | 8/1992 | McClean ................. 99/378 X |
| 5,363,748 A | * | 11/1994 | Boehm et al. .............. 99/372 |
| 5,615,604 A | * | 4/1997 | Chenglin .................. 99/332 |
| 5,636,564 A | * | 6/1997 | Weiss ..................... 99/372 X |
| 5,642,659 A | | 7/1997 | Sesona et al. |
| 5,937,742 A | * | 8/1999 | Steeb et al. ................ 99/375 |
| 5,963,784 A | * | 10/1999 | Goldberg .................. 99/382 |
| 6,016,741 A | * | 1/2000 | Tsai et al. ............... 99/377 X |
| 6,089,144 A | * | 7/2000 | Garber et al. ........... 99/379 X |

* cited by examiner

Primary Examiner—Timothy F. Simone
(74) Attorney, Agent, or Firm—Hovey Williams LLP

(57) ABSTRACT

The electrically-powered cooker has a base that pivotally supports a clam shell-type cooking unit having two independently pivotal cooking halves, each half being provided with its own hot plate. One or more dished recesses are provided in the bottom half of the unit, while a matching set of slightly raised bosses are provided on the top half. Each cooking half has its own separate electrically energized heating element to raise the temperature of the corresponding hot plate to the desired level. In use, the cooking unit is initially opened with the two halves laid open on opposite sides of the base and with the hot plates facing upwardly. After batter is poured into the dished receptacles of the bottom half and allowed to cook, the top half is closed upon it and latched, whereupon the closed unit is flipped over onto the opposite side of the base to flip the pancakes contained therein. The latch is released and the bottom unit is flipped back over to its open position to allow the other side of the pancakes to cook on the flat raised bosses of the inverted top half. When the pancakes are fully cooked, they are removed from the bosses using a spatula or the like, and the cycle is repeated.

24 Claims, 7 Drawing Sheets

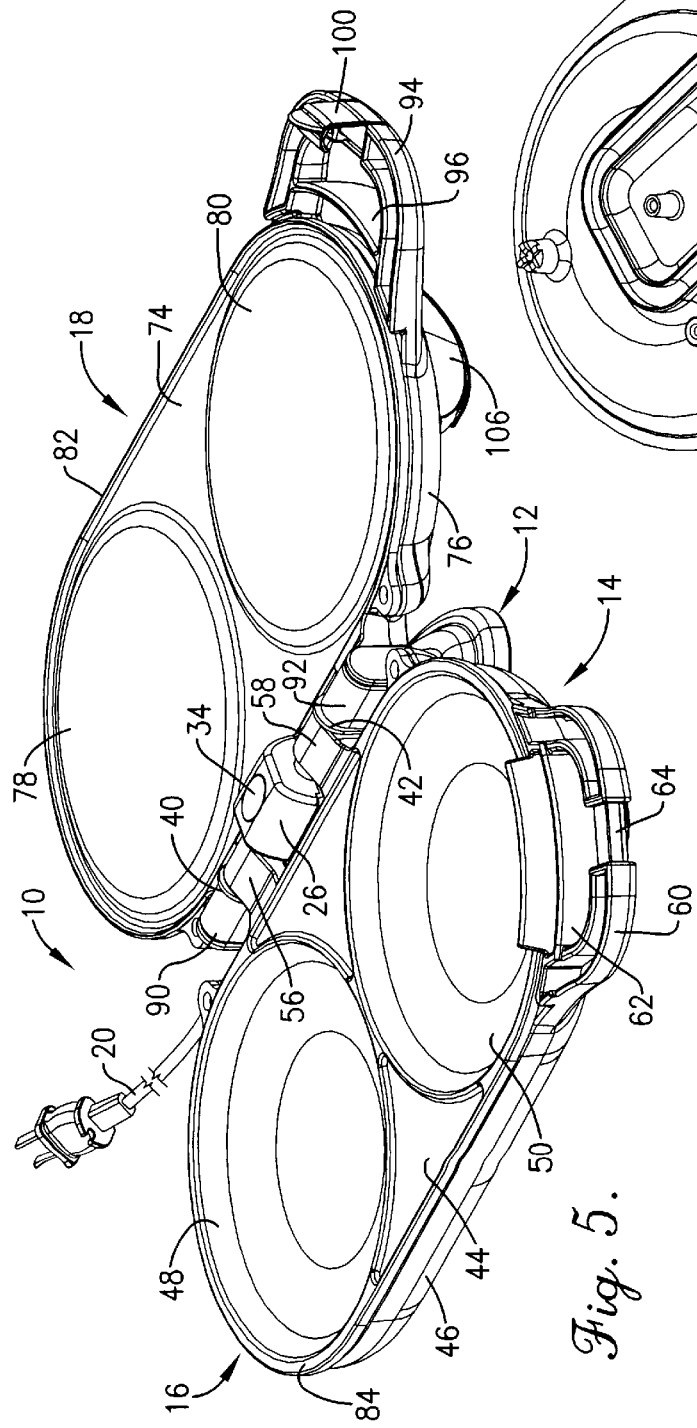
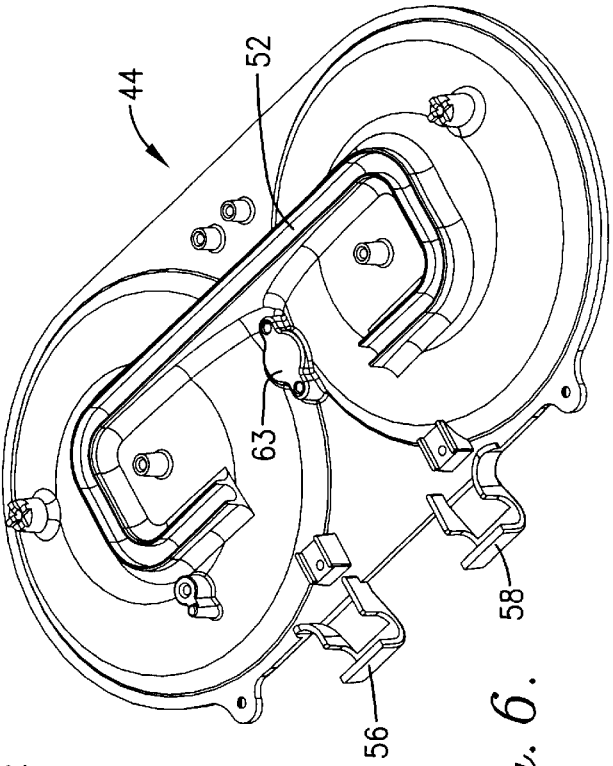
Fig. 5.
Fig. 6.

PANCAKE AND EGG COOKING APPLIANCE

TECHNICAL FIELD

The present invention relates to electrical cooking appliances and, more particularly, to an electrical appliance that is particularly adapted for quickly, easily, and neatly cooking pancakes, eggs and omelets.

BACKGROUND

Making pancakes by hand on a hot griddle requires the cook to slip a spatula under the cooking pancake at just the right time and flip the pancake over so that the opposite side is also browned. The same is true for eggs cooked on both sides, and omelets. Flipping the pancake or other item, however, is not as easy as it may seem, and can result in a mess or an unsightly finished product.

The prior art includes clam shell-type cooking devices designed to eliminate the need for flipping the pancake with a spatula. Instead, after batter is poured into the bottom half of the open device and allowed to cook on one side, the cover plate is closed and the entire device is then flipped over for cooking the other side of the pancake on the inverted cover. To remove the pancake, the cooker is held over a plate and opened, allowing the finished pancake to slip out by gravity.

One drawback of such prior art devices is that they require whichever part is doing the cooking to be placed in engagement with an external source of heat such as the heating element of a conventional range or a large hot plate to raise the temperature of the cooking half to a satisfactory level. Thus, in one relatively simple prior design, while the bottom half of the cooker sits on the heating element and cooks the bottom side of the pancake, the cold top half of the cooker remains completely out of contact with the heating element and must be heated up by the element after the device is flipped over, which significantly lengthens overall cooking time. Another design utilizes a large hot plate that straddles two heating elements of the range, or is itself electrically heated, so that the backs of both halves of the open cooker can engage the hotplate at the same time and be simultaneously heated. However, this second design is unwieldy and complicated.

Thus, an object of the present invention is to overcome the deficiencies of the prior art by providing an electrically powered clam shell-type cooker that requires no external heat source of any kind and can therefore be used on virtually any counter top or other surface where electrical power is available for quickly, conveniently, and easily preparing attractive, well-shaped pancakes and other food items such as eggs and omelets without an unsightly mess.

The electrically-powered cooker of the present invention uses a clam shell-type cooking unit having top and bottom pivotally interconnected cooking halves that are each provided with their own internal heating element. When the unit is closed, it may be maintained in a normal position or flipped over into an inverted position. When the unit is open, the two halves can be laid out beside one another with both of their hot plates facing upwardly. In a preferred embodiment, the two separate halves of the cooking unit are pivoted to a common base that sits on the counter or other supporting surface and supports the unit for hinging between its open, upright, and flipped-over positions.

When a pancake is to be cooked, for example, the cooking unit is laid open with the two cooking halves on opposite sides of the hinge axis and their hot plates facing upwardly. Batter is poured onto the hot plate of the bottom half, which is preferably formed into a dished recess to contain and shape the batter into a circle, and the batter is allowed to cook for a period of time. When the bottom side of the pancake is cooked, the top half of the unit with its flat hot plate is rotated about the base and closed on top of the pancake. Then the entire unit is flipped over to the opposite side of the base into an inverted position to correspondingly flip the pancake over, the uncooked side now resting on the hot plate of the inverted top half. The inverted bottom half is then swung back off the pancake to the other side of the base while the uncooked side of the pancake browns. When the pancake is finished, it is removed with a spatula, and the process is repeated.

In a preferred embodiment each cooking surface contains multiple regions for cooking more than one pancake at a time. Furthermore, in a preferred embodiment, a handle formed by two separate handle halves on the two cooking halves of the unit juts out from the cooker at an oblique angle that is most conducive to grasping by the user for flipping the unit and the cooking halves between their various positions. Preferably, the conductor that supplies electrical power to the heating elements of the two cooking halves is totally enclosed within the base and hinge structure of the cooker for safety and cleanliness. A power cord leads from the back of the cooker, while the flip handle projects from the front end of the cooker closest to the user.

BRIEF DESCRIPTION OF THE DRAWINGS

FIG. 5 is a top, front isometric view of the cooker with the cooking unit fully opened;

FIG. 6 is a bottom isometric view of the hot plate of the bottom half of the cooking unit;

DETAILED DESCRIPTION

Figure 1:
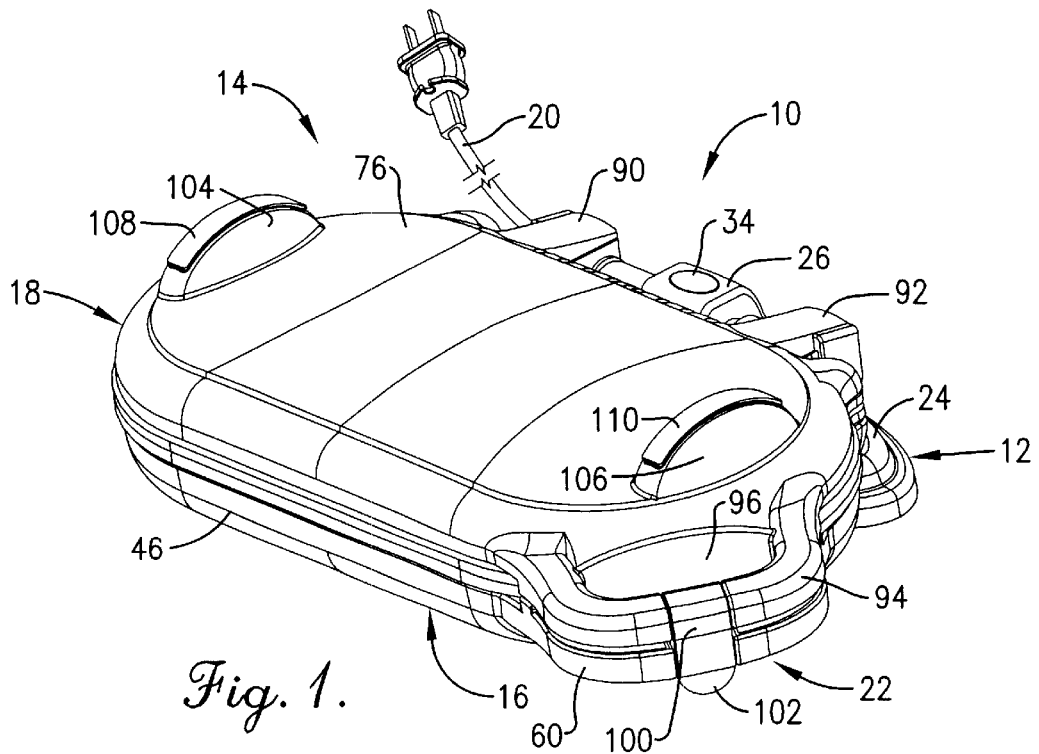
FIG. 1 is a top, front isometric view of a cooker constructed in accordance with the principles of the present invention with its cooking unit disposed in one of its closed positions.
Figure 2:
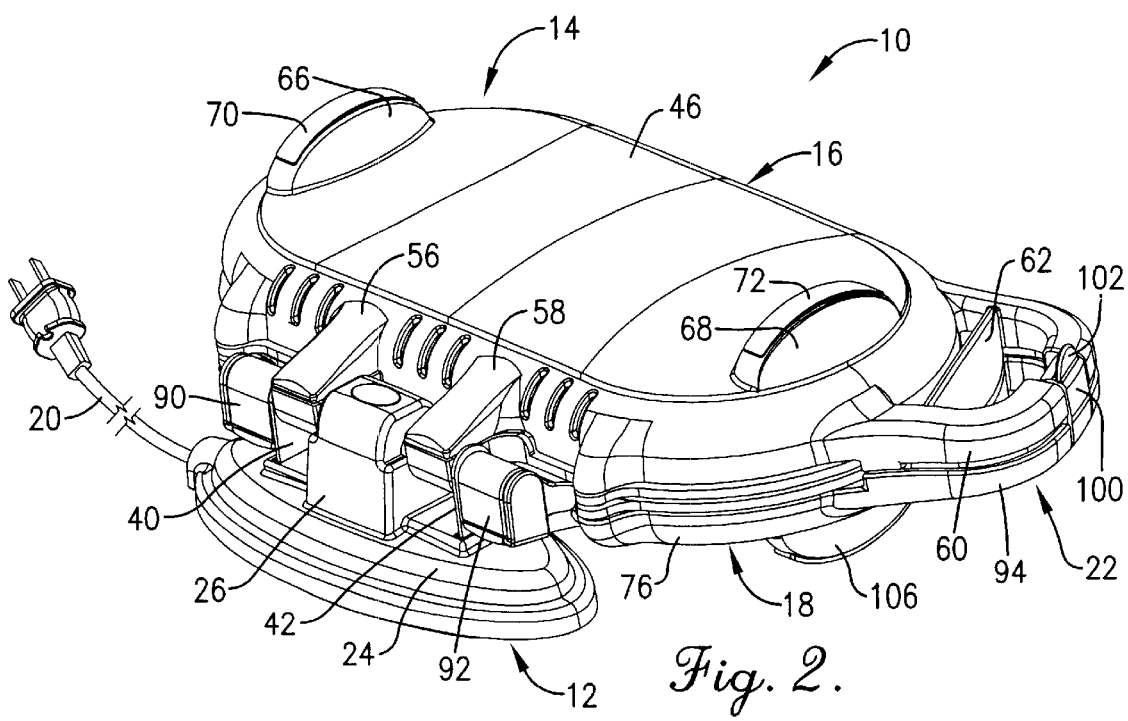
FIG. 2 is a top, front isometric view of the cooker with the cooking unit flipped over to its inverted, closed position.
Figure 3:
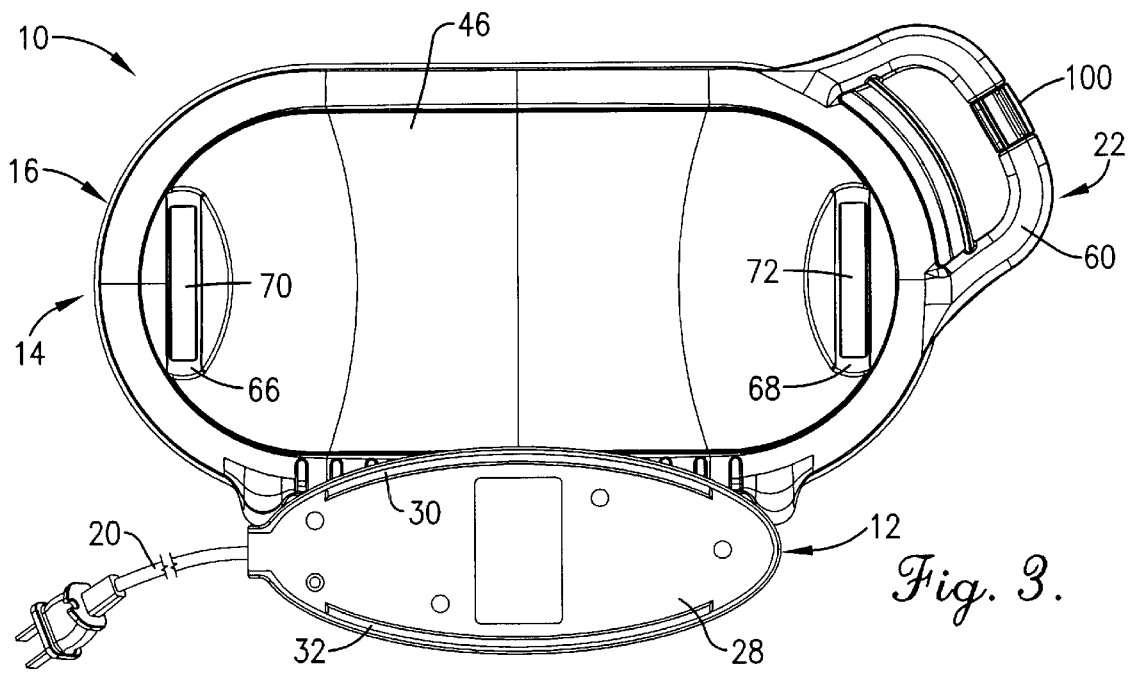
FIG. 3 is a bottom plan view of the cooker.
Figure 4:
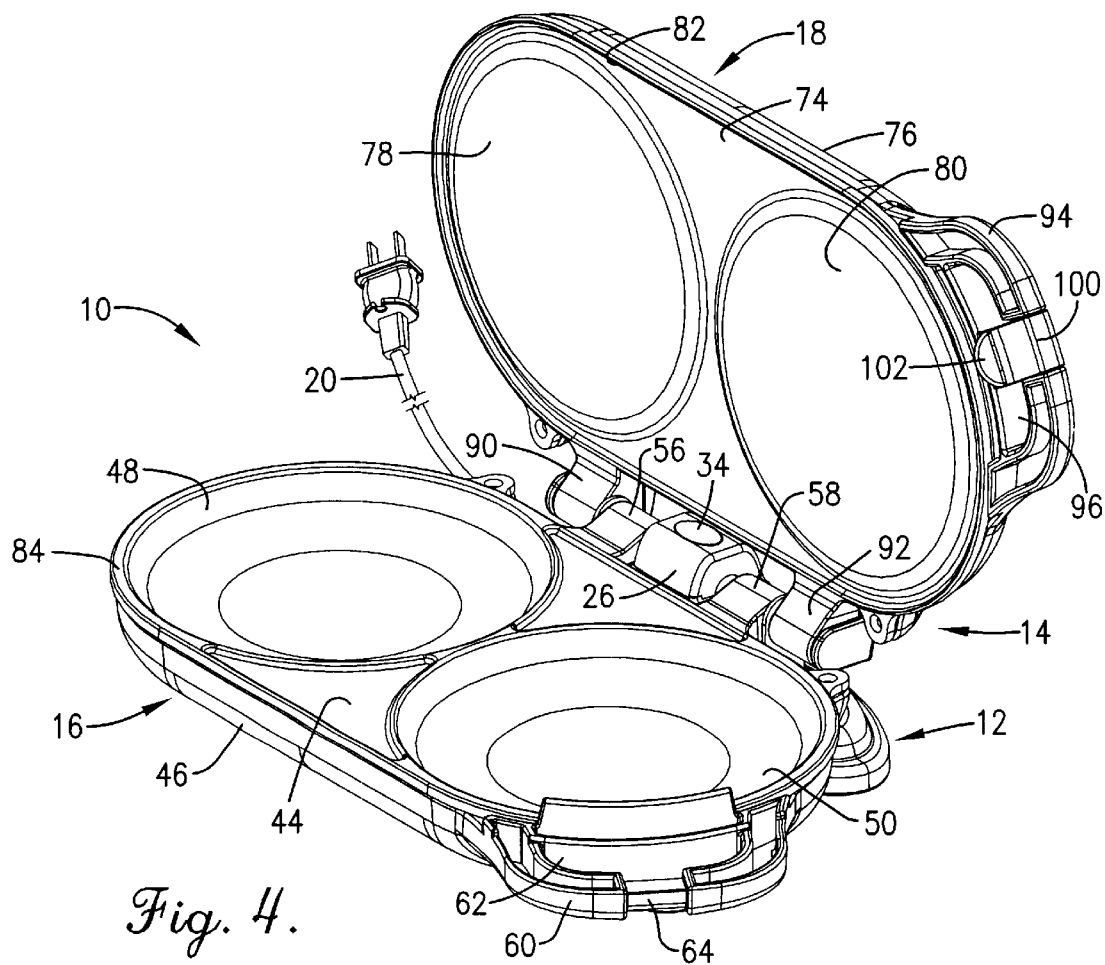
FIG. 4 is a top, front isometric view of the cooker with the cooking unit partially opened.

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Referring initially to FIGS. 1–5, the electrical cooker 10 in a preferred embodiment includes a base 12 of generally oval or elliptical configuration and a clam shell-type cooking unit 14 pivotally supported on base 12. Unit 14 includes a pair of cooking halves 16 and 18 that are pivotal with respect to one another and are each individually pivotal with respect to base 12. Cooking halves 16,18 are supplied electrical power by a power cord 20 leading from one end of base 12 and adapted for plugging into a suitable wall socket (not shown).

Cooking unit 14 has a generally elongated, elliptical configuration overall and is provided with a handle 22 at one end thereof which may be gripped by the user during cooking operations as hereinafter explained. Preferably, handle 22 is disposed at that end of unit 14 which is opposite from the cord 20. Thus, in use, it will be appreciated that base 12 is adapted to rest upon a flat supporting surface such as a counter top with the cord 20 leading away from the user and plugged into a wall socket or the like while the handle 22 faces the user. As illustrated, handle 22 is preferably obliquely disposed with respect to the longitudinal axis of unit 14 to facilitate gripping by the user and flipping of unit 14 between alternative positions on opposite sides of base 12.

Figure 10:
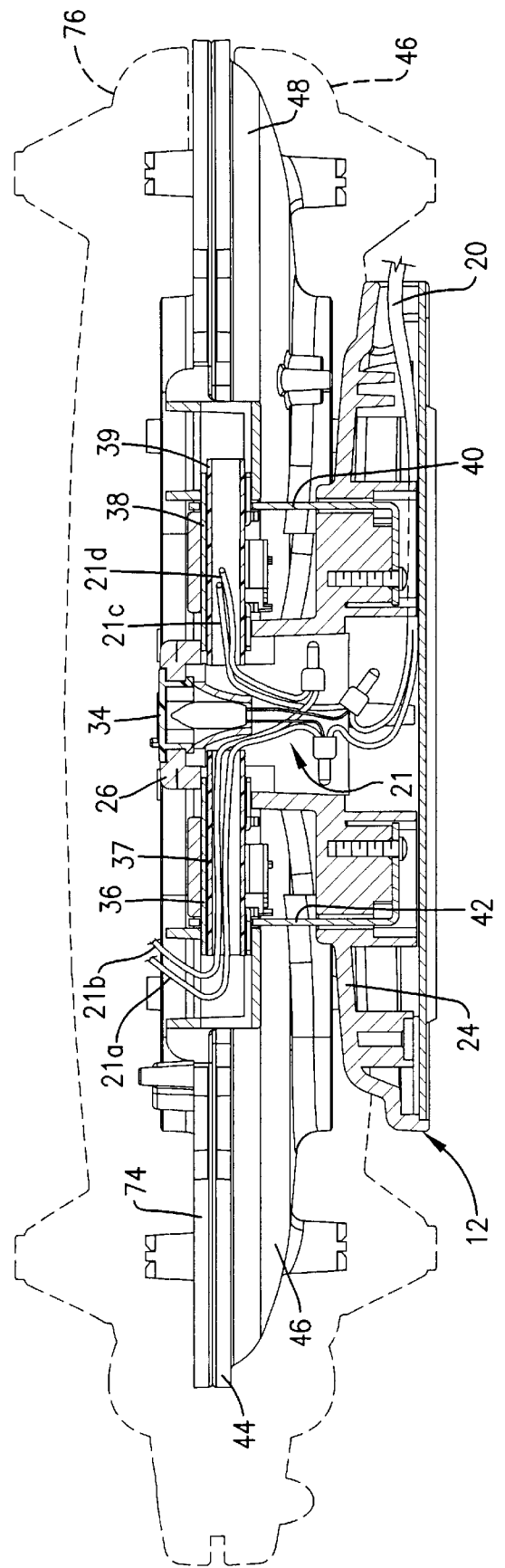
FIG. 10 is a cross-sectional view of the cooker taken substantially along line 10—10 of FIG. 9.

Base 12 is generally hollow (see also FIG. 10) and includes a generally concavo-convex main body 24 and a hollow, upstanding pedestal 26 rising upwardly from main body 24. A removable bottom plate 28 (FIG. 3) is detachably secured to the underside of body 24 and has a pair of non-skid strips 30 and 32 of suitable rubber-like material disposed for engaging the counter top surface to resist movement of base 12 during use of the appliance. An indicator light 34 is provided in the upper extremity of pedestal 26 and is electrically connected to conductor 21 within base 12 so as to be illuminated whenever power cord 20 is plugged a into live source of electrical power. Indicator light 34 is disposed to be visible in all positions of cooking unit 14 and cooking halves 16, 18 thereof, as will be apparent from the figures.

A pair of axially aligned, rotatable pivot tubes 36 and 38 (FIGS. 8, 9 and 10) project laterally outwardly from opposite sides of pedestal 26 to define the axis of pivoting movement of cooking unit 14 and cooking halves 16, 18. Pivot tubes 36, 38 are rotatably supported by pedestal 26 and by a pair of corresponding, upstanding struts 40 and 42 spaced outwardly from pedestal 26 and rising upwardly from the top surface of body 24. A conductor 21 within base 12 connects to power cord 20 and comprises four leads 21a, 21b, 21c and 21d. Leads 21a and 21b are threaded through tube 36 and leads 21c and 21d are threaded through pivot tube 38 for ultimate connection with heating elements within cooking halves 16, 18 as subsequently described. Preferably, base 12 is constructed from a suitable temperature-resistant phenolic resin and is injection molded. Pivot tubes 36 and 38 are formed from a suitable metallic material such as an aluminum alloy. Silicone fiber inserts 37 and 39 are disposed within tubes 36, 38 respectively to shield conductor leads 21a–d from tubes 36 and 38.

The two cooking halves 16, 18 of cooking unit 14 are very similar to each other in most respects, but are also different in certain details. Therefore, each will be described separately. Dealing first with bottom half 16, it will be noted that half 16 includes a hot plate 44 and a generally concavo-convex, generally elliptical and elongated exterior housing 46 that supports hot plate 44. Hot plate 44 is preferably constructed from a die cast aluminum alloy, while housing 46 is constructed from a suitable temperature-resistant phenolic resin and is injection molded. A pair of circular, dish-shaped recesses 48 and 50 (FIGS. 4 and 5) are formed within the top surface of hot pate 44 with their line of centers extending parallel to the pivot axis defined by pivot tubes 36, 38 and parallel to the longitudinal axis of bottom half 16.

Figure 8:
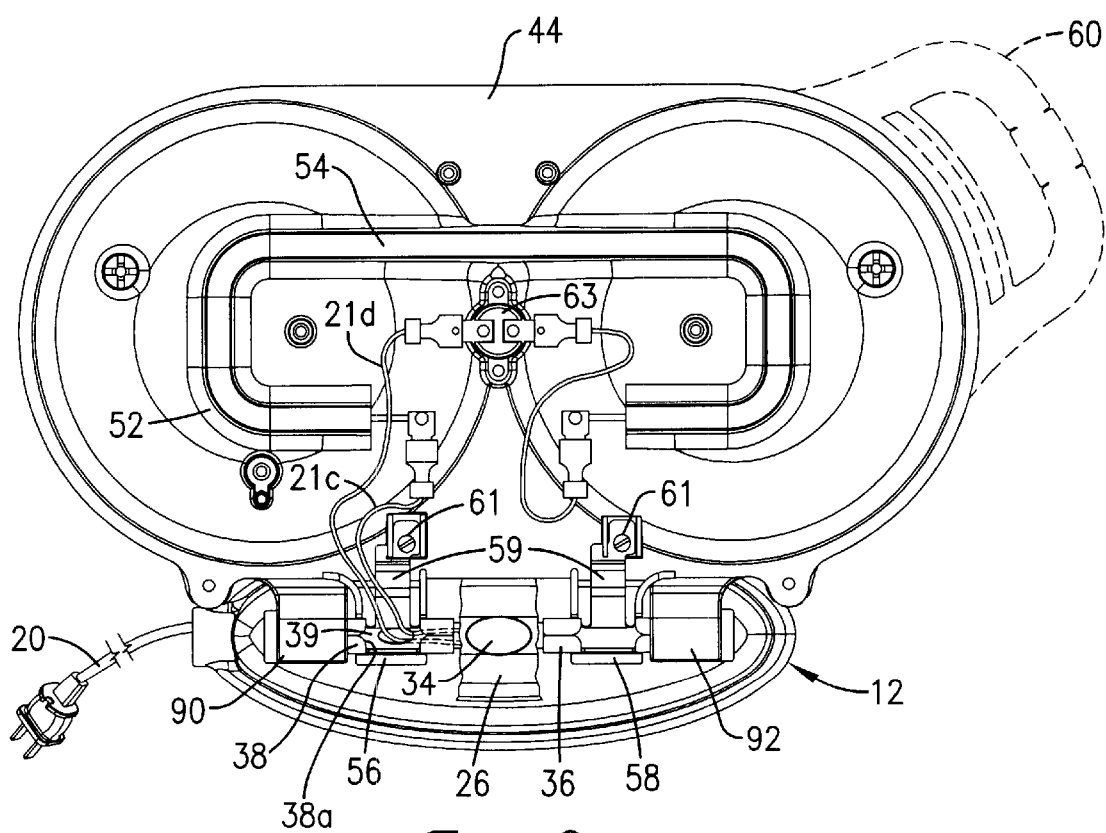
FIG. 8 is a top plan view of the cooker with the cooking unit in the inverted closed position of FIG. 2 and with the outer housing of the inverted bottom half of the unit removed to reveal internal details of construction.

As illustrated in FIGS. 6 and 8, the underside of hot plate 44 is formed to present a generally C-shaped channel 52 that extends across the bottom of each recess 48, 50 and complementally receives a heating element 54. Element 54 at its opposite ends is electrically connected to conductor leads 21c and 21d which extend through an opening 38a in pivot tube 38 and through a hollow mounting lug 56 on cooking unit 16 formed by cooperating upper and lower portions of hot plate 44 and housing 46. A second mounting lug 58 is similarly provided on the opposite side of pedestal 26. Mounting lugs 56 and 58 house central portions of pivot tubes 36, 38 and are disposed on opposite sides of pedestal 26 in juxtaposed relationship therewith. Each pivot tube 36, 38 has a mounting leg 59 extending laterally therefrom that is attached to the bottom surface of hot plate 44 by a screw 61 to secure tubes 36, 38 to hot plate 44. Tubes 36, 38 thus rotate within pedestal 26 and with bottom half 16 when half 16 pivots about base 12. Heating element 54 is in heat transfer relationship with hot plate 44 so as to heat recesses 48 and 50 to a suitable cooking temperature for pancakes, eggs and the like when power cord 20 is plugged into a source of electrical power. A thermostat 63 connected in series with heating element 54 senses and controls the temperature of hot plate 44.

A generally U-shaped handle half 60 juts out obliquely from one end of bottom half 16 and is integrally formed with the rest of housing 46. Handle half 60 comprises one-half of handle 22 that is formed when bottom and top halves 16, 18 are superimposed upon one another to close cooking unit 14. Handle half 60 is in the nature of an open loop that is sized to readily receive the fingers of a user's hand, there being a knuckle guard 62 provided within the open loop of handle half 60 to shield the user's fingers from proximal hot surfaces associated with hot plate 44. Handle half 60 also has a reduced dimension central bar portion 64 that serves as part of a latch assembly for releasably retaining halves 16, 18 together, as will hereinafter be described in more detail. A pair of integrally molded feet 66 and 68 on housing 46 are disposed at opposite ends thereof and project generally transversely outwardly to engage the counter top or other supporting surface when bottom half 16 is in its open position so as to fully support half 16 in that position and preclude further pivotal movement thereof. A pair of non-skid strips 70 and 72 may be provided on the outermost extremity of feet 66 and 68 respectively.

Like bottom half 16, top cooking half 18 is elongated and generally elliptical shaped with its longitudinal axis extending parallel to the pivot axis defined by pivot tubes 36 and 38. Top half 18 has substantially the same dimensions as bottom half 16 and is designed to be in perfect registration with bottom half 16 when the two halves are face-to-face to present the closed cooking unit 14. Top half 18 has a hot plate 74 of die cast aluminum alloy and a preferably injection molded, generally concavo-convex exterior housing 76 that supports hot plate 74, the housing 76 being preferably constructed from high temperature-resistant phenolic resin.

Hot plate 74 has a pair of slightly raised, circular, flat circular cooking regions or bosses 78 and 80 that are disposed for registration with recesses 48 and 50 of bottom cooking half 16 when cooking unit 14 is closed. The diameter of bosses 78, 80 is slightly less than the diameter of corresponding recesses 48 and 50 so that bosses 78, 80 are slightly nested down into recesses 48, 50 when cooking unit 14 is closed. Thus, a continuous marginal edge 82 (FIGS. 4 and 5) on hot plate 74 of top half 18 and a similar continuous marginal edge 84 on hot plate 44 of bottom half 16 come into mutually abutting engagement when cooking unit 14 is closed to provide an effective seal around the interior cooking area of unit 14.

Figure 7:
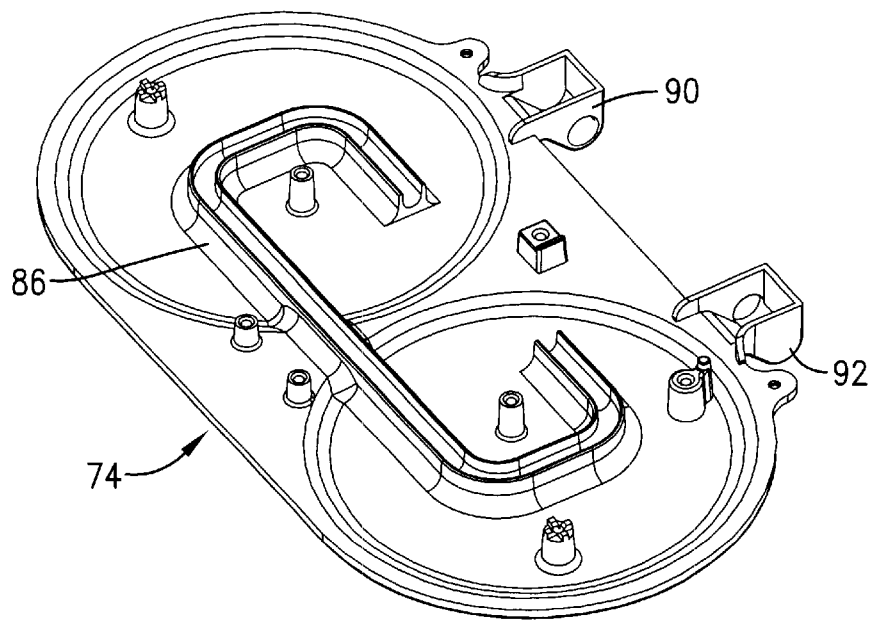
FIG. 7 is a bottom isometric view of the hot plate of the top half of the cooking unit.
Figure 9:
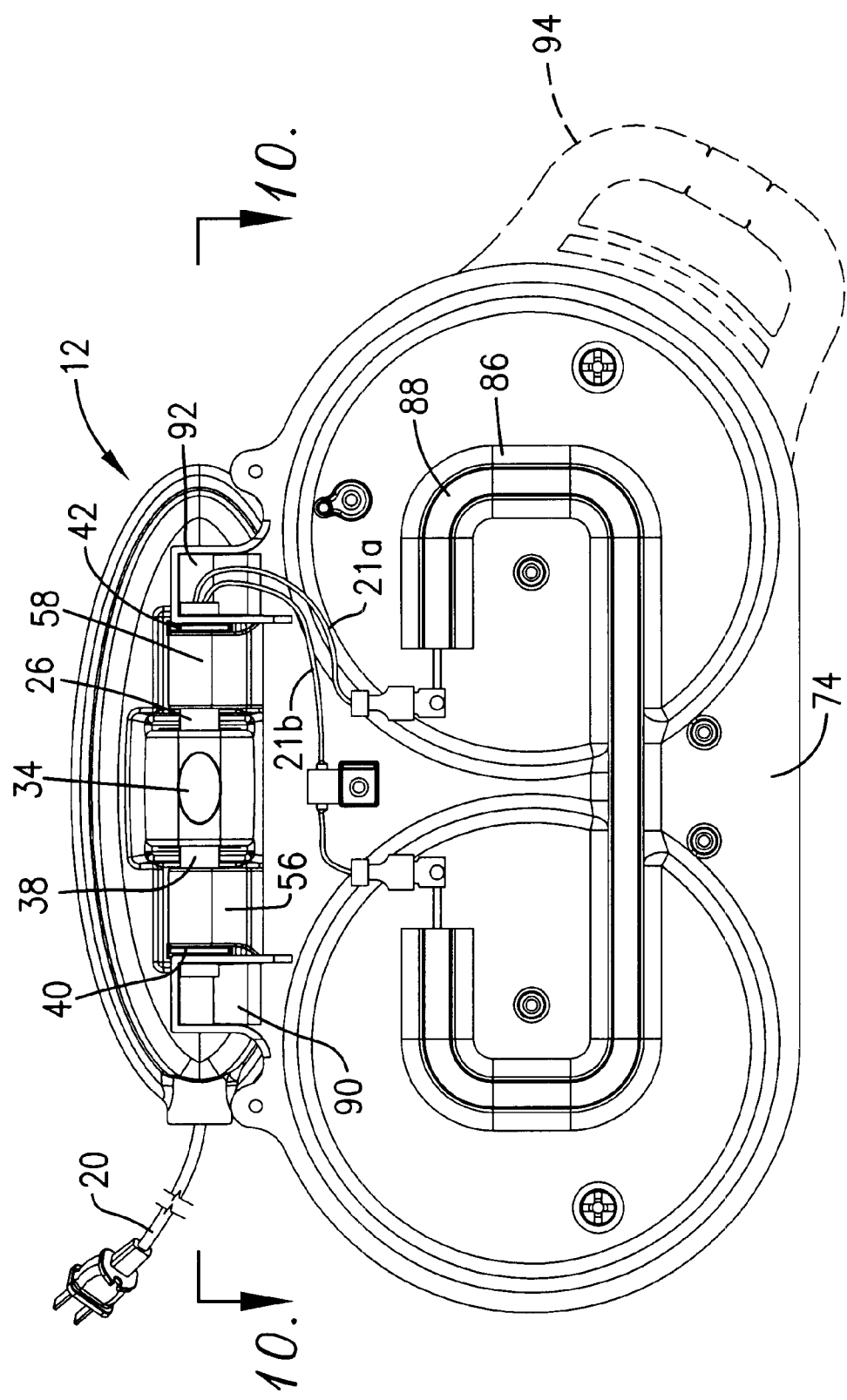
FIG. 9 is a top plan view of the cooker with the cooking unit in the upright closed position of FIG. 1 and with the outer housing of the top half of the unit removed to reveal internal details of construction.

As illustrated in FIGS. 7 and 9, the underside of hot plate 74 has a formed, generally C-shaped channel 86 that bridges the bosses 78, 80. A heating element 88 is nested within channel 86 and is connected at its opposite ends to leads 21a and 21b of conductor 21. Heating element 88 is thus disposed to elevate the hot plate 74 to a cooking temperature when power cord 20 is plugged into a source of electrical power. Leads 21a and 21b are threaded through a hollow mounting lug 92 of top half 18 and thence into the open end of pivot tube 36 so as to remain totally enclosed in all positions of pivoting movement of cooking half 18. A similar hollow mounting lug 90 projects from top half 18 on the opposite side of pedestal 26. Mounting lugs 90, 92 are pivotally supported on the outer ends of pivot tubes 36 and 38 outboard of corresponding lugs 56, 58 associated with bottom half 16.

A generally U-shaped, loop-type handle half 94 juts out from one end of top half 18 at an oblique angle to the longitudinal axis of half 18 and the pivot axis defined by pivot tubes 36, 38. Handle half 94 represents the other half of handle 22 defined in part by handle half 60 on bottom half 16. Handle half 94 is disposed to be in registered alignment with handle half 60 when cooking unit 14 is closed so as to complete the handle 22. A knuckle guard 96 within the loop defined by handle half 94 and slightly outboard of housing 76 shields the knuckles of the user from hot surfaces associated with hot plate 74.

The central portion of handle half 94 has a reduced dimension bar portion 98 like the corresponding portion 64 on handle half 60 and carries a generally C-shaped, yieldably resilient latching clip 100. Clip 100 is dimensioned to be retained on bar portion 98 of handle half 94 without additional fasteners and is disposed to releasably hook over and be snapped onto and around bar portion 64 of handle half 60 when cooking unit 14 is closed. Thus, clip 100 serves as a releasable device for holding cooking halves 16, 18 in face-to-face engagement to keep cooking unit 14 closed when needed. Of course, clip 100 may be quickly released by simply pulling outwardly on a tab 102 thereof to disconnect clip 100 from bar portion 64 of cooking half 16.

Like bottom half 16, the back surface of housing 76 of top half 18 is provided with a pair of feet 104 and 106 to support top half 18 when unit 14 is completely opened. Rounded exterior extremities of feet 104 and 106 are disposed to engage the surface of the counter top or other supporting surface and thus prevent opening of top unit 18 beyond a horizontal position when unit 14 is fully opened. A pair of non-skid strips 108 and 110 are adhered to feet 104 and 106 respectively to help stabilize the cooker when cooking unit 14 is fully opened with hot plates 44 and 74 facing upwardly.

Operation

The steps in using cooker 10 to make pancakes or the like are illustrated in FIGS. 11–14. When power cord 20 is plugged into a wall socket or the like, indicator light 34 is illuminated and both heating elements 54 and 88 are energized to raise the hot plates 44 and 74 to a cooking temperature. Preferably, cooker 10 is oriented with the handle 22 facing the user.

Figure 11:
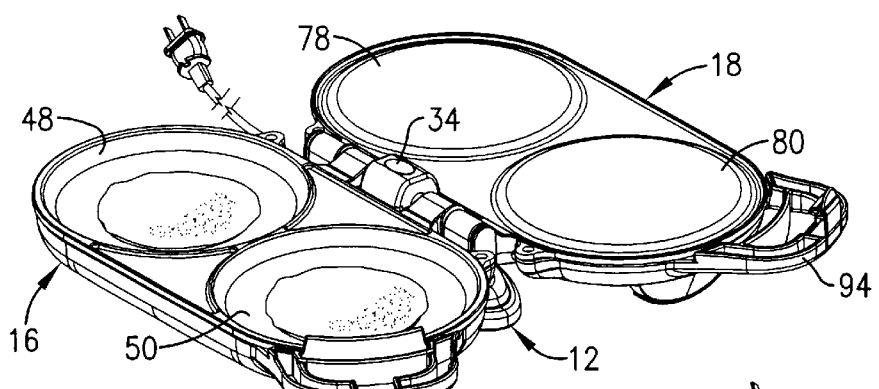
FIGS. 11, 12, 13, and 14 are top front isometric views of the cooker illustrating sequential steps in the use of the cooker.

When hot plates 44 and 74 have reached the cooking temperature, cooker 10 is ready for use. Initially, unit 14 is opened so that cooking halves 16 and 18 are laid back in their opened positions as shown in FIG. 11 with hot plates 44 and 74 facing upwardly and the feet 66, 68 and 104, 106 resting upon the counter top or other supporting surface. As noted, the two cooking halves 16 and 18 are disposed on opposite sides of base 12 at this time.

Figure 12:
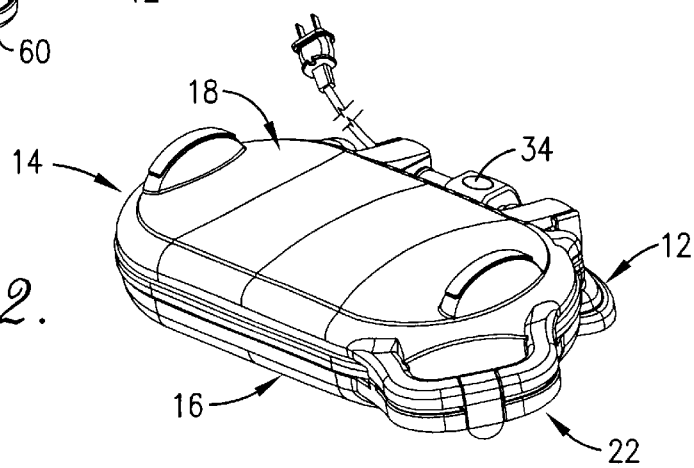
Figure 13:
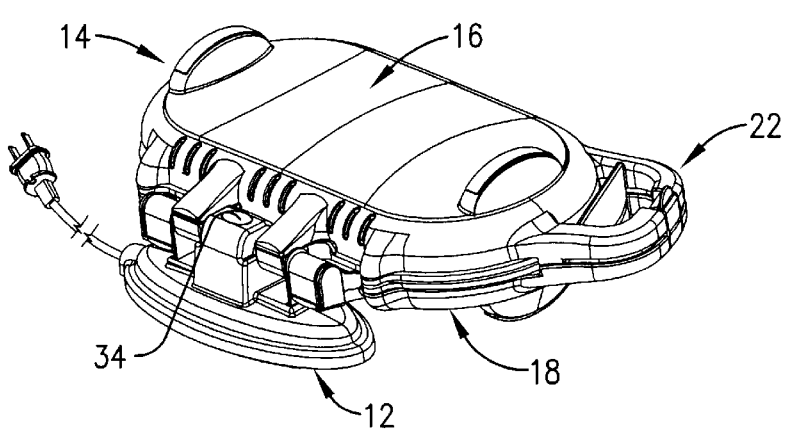

Batter is then poured into the two recesses 48, 50 of bottom half 16 and allowed to cook until such time as bubbles start to appear on the top side of the pancakes. This is an indication that the bottom side of the pancakes has been fully cooked. Thereupon, top half 18 is gripped by its handle half 94 and pivoted around base 12 until superimposed on top of bottom half 16 as illustrated in FIG. 12. Latching clip 100 is locked by the user at this time to maintain unit 14 securely closed. Gripping the entire handle 22, the user then flips unit 14 onto the opposite side of base 12 into an inverted condition as illustrated in FIG. 13, which now places bottom half 16 on top of top half 18 so that the pancakes inside are likewise flipped over and continue cooking on hot bosses 78, 80.

Figure 14:
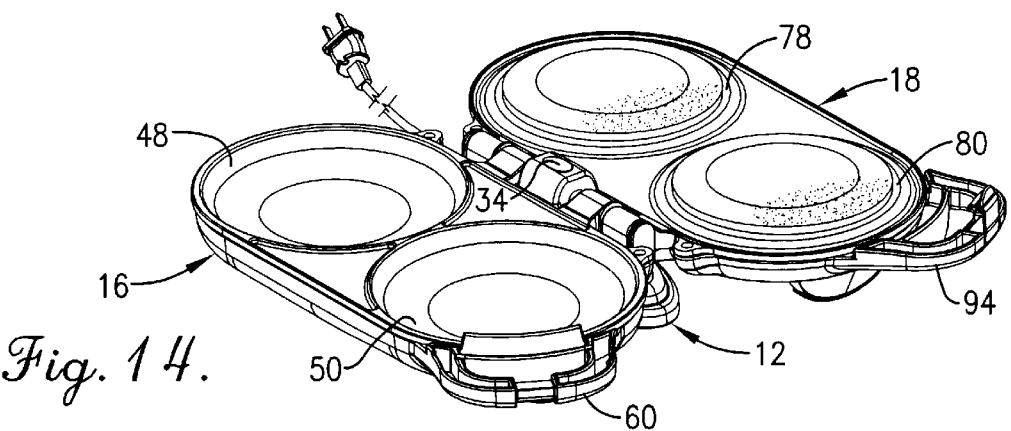

The user then releases the latch 100 and, grasping handle half 60 of bottom half 16, flips half 16 back over and across base 12 to reopen unit 14 as shown in FIG. 14. However, the flipped over pancakes remain cooking on the bosses 78, 80 of top hot plate 74 at this time, leaving recesses 48 and 50 empty. Once the other sides of the pancakes on bosses 78, 80 have fully cooked, the pancakes maybe easily removed with a spatula. In the meantime, while the pancakes are cooking on bosses 78, 80, a new batch of batter may be poured into the recesses 48 and 50 so that new pancakes may be cooking at the same time the previous batch is being finished. This cycle is repeated until the complete order of pancakes is finished.

It will be appreciated that the principles of the present invention are not limited to a cooker having only two sets of recesses 48, 50 and flat bosses 78, 80. A greater or smaller number of such components maybe provided without departing from the principles of the present invention. Furthermore, it is possible that many principles of the present invention may be carried out without the use of a base 12 common to both halves of the cooking unit 14. It may be possible in this respect to simply make the two halves 16, 18 hinge directly to one another and for the power cord to enter one end of the hinge structure rather than the base 12. However, use of a base 12 is preferred.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

What is claimed is:

1. An electrically powered cooker for food products comprising:
    a base adapted to rest on a supporting surface;
    first and second cooking halves each having a hot plate,
    said halves being supported by said base for selective pivotal movement between a first closed position in which the halves are superimposed on top of one another on one side of an axis of pivoting movement of the halves with said hot plates facing one another, a second closed position in which the halves are in an inverted superimposed relationship on the opposite side of the axis of pivoting movement with said hot plates facing one another, and an open position in which the halves are laid open on opposite sides of said axis of pivoting movement with both of said hot plates facing upwardly,
    each of said halves including an internal heating element in heat transfer relationship with said hot plate of the half; and
    an electrical conductor electrically connected with each of said heating elements for supplying electrical power to the elements.

2. An electrically powered cooker as claimed in claim 1,
    said cooking halves each having a handle half projecting obliquely therefrom with respect to said axis of pivoting movement of the cooking halves,
    the two handle halves being disposed to be superimposed upon one another and cooperatively present a complete handle when the cooking halves are in either of said closed positions.

3. An electrically powered cooker as claimed in claim 2,
    each of said handle halves being configured as a loop for receiving a user's fingers.

4. An electrically powered cooker as claimed in claim 2,
    said cooker being generally elongated in a direction parallel to said axis of pivoting movement and presenting a pair of opposite ends,
    said conductor projecting outwardly from one end of the cooker and said handle projecting outwardly from the opposite end of the cooker.

5. An electrically powered cooker as claimed in claim 1,
    further comprising tubular structure defining said axis of pivoting movement of the cooking halves,
    said cooking halves having mounting lugs that pivot about said axis of the tubular structure,
    said conductor being housed internally within and enclosed by said base, said tubular structure, and said lugs.

6. An electrically powered cooker as claimed in claim 5,
    each of said cooking halves having a pair of said mounting lugs.

7. An electrically powered cooker as claimed in claim 5,
    said base including an upstanding pedestal that projects upwardly between the cooking halves when the halves are in their open position and beside the halves when the halves are in either of their closed positions,
    said tubular structure projecting outwardly in opposite lateral directions from said pedestal,
    each of said cooking halves having a pair of said mounting lugs spaced along the tubular structure and disposed on opposite sides of the pedestal.

8. An electrically powered cooker as claimed in claim 7,
    said pedestal having an indicator light at the upper extremity of the pedestal that is adapted to be illuminated when the conductor is connected to a source of electrical power,
    said indicator light being visible when the cooking halves are in any of their positions.

9. An electrically powered cooker as claimed in claim 1,
    said cooking halves having external feet disposed to engage a supporting surface when the halves are in said open position whereby to preclude pivoting movement of the halves beyond said open position.

10. An electrically powered cooker as claimed in claim 9,
    each of said cooking halves having a pair of said external feet.

11. An electrically powered cooker as claimed in claim 1,
    the hot plate of one of said cooking halves having a circular dished recess,
    the hot plate of the other of said cooking halves having a circular flat region disposed to register with said dished recess when cooking halves are in said closed position.

12. An electrically powered cooker as claimed in claim 11,
    said flat region being raised.

13. An electrically powered cooker as claimed in claim 11,
    said one cooking half having a pair of said dished recesses arranged in a line that extends generally parallel to the axis of pivoting movement of the cooking halves,
    said other cooking half having a pair of said flat regions arranged in a line that extends generally parallel to the axis of pivoting movement of the cooking halves.

14. An electrically powered cooker as claimed in claim 13,
    said cooking halves being elongated in a direction parallel to said axis of pivoting movement and presenting a pair of opposite ends,
    said cooking halves each having a handle half projecting from one end of the respective cooking half,
    the two handle halves being disposed to be superimposed upon one another and cooperatively present a complete handle when the cooking halves are in either of said closed positions.

15. An electrically powered cooker as claimed in claim 14,
    said handle halves projecting obliquely from their respective cooking halves with respect to said axis of pivoting movement.

16. An electrically powered cooker as claimed in claim 15.
    each of said handle halves being configured as a loop for receiving a user's fingers.

17. An electrically powered cooker for food products comprising:
    first and second cooking halves each having a hot plate,
    said halves being pivotally interconnected and adapted for selective positioning in a first closed position in which the halves are superimposed on top of one another with said hot plates facing one another, a second closed position in which the halves are in an inverted superimposed relationship with said hot plates facing one another, and an open position in which the halves are laid open on opposite sides of an axis of pivoting movement between the halves with both of said hot plates facing upwardly,
    each of said halves including an internal heating element in heat transfer relationship with said hot plate of the half; and an electrical conductor electrically connected with each of said heating elements for supplying electrical power to the elements, said cooking halves each having a handle half projecting obliquely therefrom with respect to said axis of pivoting movement of the cooking halves, the two handle halves being disposed to be superimposed upon one another and cooperatively present a complete handle when the cooking halves are in either of said closed positions.

18. An electrically powered cooker as claimed in claim 17, each of said handle halves being configured as a loop for receiving a user's fingers.

19. An electrically powered cooker as claimed in claim 17, said cooker being generally elongated in a direction parallel to said axis of pivoting movement and presenting a pair of opposite ends, said conductor projecting outwardly from one end of the cooker and said handle projecting outwardly from the opposite end of the cooker.

20. An electrically powered cooker as claimed in claim 17, said cooking halves being pivotally connected to a common base for pivoting movement relative to the base about the axis of pivoting movement of the cooking halves relative to each other.

21. An electrically powered cooker as claimed in claim 20, said base having tubular structure that defines said axis of pivoting movement of the cooking halves, said cooking halves having mounting lugs that pivot about said axis of the tubular structure, said conductor being housed internally within and enclosed by said base, said tubular structure, and said lugs.

22. An electrically powered cooker as claimed in claim 21, each of said cooking halves having a pair of said mounting lugs.

23. An electrically powered cooker as claimed in claim 21, said base including an upstanding pedestal that projects upwardly between the cooking halves when the halves are in their open position and beside the halves when the halves are in either of their closed positions, said tubular structure projecting outwardly in opposite lateral directions from said pedestal, each of said cooking halves having a pair of said mounting lugs spaced along the tubular structure and disposed on opposite sides of the pedestal.

24. An electrically powered cooker as claimed in claim 23, said pedestal having an indicator light at the upper extremity of the pedestal that is adapted to be illuminated when the conductor is connected to a source of electrical power, said indicator light being visible when the cooking halves are in any of their positions.

* * * * *